United States Patent Office

2,749,357
Patented June 5, 1956

2,749,357
PROCESS FOR DERESINATING CANDELILLA WAX

Abram Zlodnik, Mexico City, Mexico

No Drawing. Application March 4, 1953,
Serial No. 340,412

10 Claims. (Cl. 260—428.5)

The present invention relates in general to the industrialization of candelilla wax and refers more particularly to a novel and useful process for deresinating such candelilla wax, whereby it is converted into a raw material having a wide field of use and capable of competing with fine hard waxes insofar as concerns the properties and possibilities of industrial utilization thereof.

As is well known, candelilla wax is composed of esters, paraffins, and resins. These resins are present in a proportion of from 30% to 40% by weight of the wax, whereas fine waxes, such as, for example, carnauba wax, contain barely from 2% to 3% of resins.

The resin of candelilla wax is a sticky, dark-colored product which is semi-solid at normal temperature and has the peculiar odor of resins. Precisely because of the presence of such resin, candelilla wax is considered, apparently justly, as inferior to hard fine waxes. Candelilla wax cannot be used for many purposes for which wax is normally employed, due to its high resin content.

It is therefore indispensable to deresinate candelilla wax to improve its quality and accordingly the present invention has, for its principal object, that of providing a suitable process for such deresination, to obtain candelilla wax proper for industrial use in fields heretofore barred to said wax.

None of the presently known processes for deresinating candelilla wax is suitable for its industrial use and accordingly deresinated candelilla wax, prepared on a scale sufficient for such industrial use, has not been available.

After numerous observations I have found that the resin contained in candelilla wax is not homogenized with the other components of said wax, i. e. candelilla wax is not a solution of the resin in the paraffins and esters also constituting said wax but rather the resin forms a chain of agglomerates set within the other components of the wax; and I have further discovered that certain solvents dissolve the resin without dissolving the rest of the wax and that the penetrating strength of said solvents is not more than 2 millimeters during a period of various hours.

On the basis of the above result of my observations, I was able to conclude that by reducing candelilla wax to flakes or platelets of a thickness not exceeding four millimeters, its deresination is possible, by treating it in the cold during various hours with appropriate solvents which are mixtures of aliphatic alcohols and aliphatic chlorinated derivatives such as, for example and principally, a mixture of equal volumes of commercial ethyl alcohol and chlorinated aliphatics, such as dichloroethane, dichloropropane, trichloroethylene, etc. In this manner the wax flakes become porous as a result of the dissolution of the resin, losing about 35% of their weight; and after separating them from the solvent and draining them, they are melted under vacuum, whereby the deresinated wax is obtained. The wax flakes are separated from the solvent by decantation of the latter, and after evaporating the solvent the resin is obtained as a semi-solid mass. By means of the evaporation of the solvent, pure solvent is again obtained which is therefore suitable for re-use in the washing cycle.

The following examples will serve to clarify the process of the invention.

*Example 1*

Candelilla wax, previously reduced to flakes of a thickness not exceeding 4 millimeters, is introduced into an extracting apparatus. The apparatus is then filled with a solvent consisting of 50% ethyl alcohol, 40% dichloroethane and 10% carbon tetrachloride and the mixture is allowed to stand for ten hours at room temperature (20° to 25° C.). Thereafter the solvent is withdrawn and a like quantity of pure solvent is substituted therefor, this operation being repeated four or five times. The solvents used are evaporated, there being obtained non-volatile, semi-solid or thick liquid resin, in the evaporator employed, as also pure solvent suitable for re-use in further washings. The porous wax flakes remaining in the extractor upon withdrawing the last solvent used, are transferred to a steam-jacketed apparatus connected with a vacuum and are steam-heated. In this way such solvent as remains in the flakes is recovered, and the melted wax is poured into molds to shape it into loaves.

*Example 2*

In a diffusion battery, similar to those used for extracting sugar from sugar-beets, one washes candelilla wax, previously reduced to flakes not more than 4 millimeters thick, with a solvent consisting of equal parts of ethyl alcohol and dichloropropane. The liquid is circulated several hours, the resin-saturated solvent being introduced into a distilling apparatus wherein said solvent is recuperated and re-cycled free of resin. The washed and resin-free wax is transferred to a vucuum melting apparatus and finished as described in Example 1.

Having thus described the invention, what I consider as new and desire to secure by Letters Patent is:

1. A process for deresinating candelilla wax comprising dividing the wax into particles having a maximum thickness of about 4 millimeters, then washing the wax flakes at temperatures not in excess of 25° C. in a solvent mixture of a minimum of 50% of an alcohol selected from the group consisting of methyl, ethyl, and isopropyl alcohol, and an aliphatic hydrocarbon selected from the group consisting of dichloropropane, trichloroethylene and chloroform, to dissolve the resins from the flakes without affecting the wax.

2. A process for deresinating candelilla wax comprising dividing the wax into particles having a maximum thickness of about 4 millimeters, then washing the wax flakes at temperatures not in excess of 25° C. in a solvent mixture of a minimum of 50% of an alcohol selected from the group consisting of methyl, ethyl, and isopropyl alcohol, and a mixture of aliphatic hydrocarbons selected from the group consisting of dichloropropane, trichloroethylene and chloroform, to dissolve the resins from the flakes without affecting the wax.

3. A process for deresinating candelilla wax comprising dividing the wax into particles having a maximum thickness of about 4 millimeters, then washing the wax flakes at temperatures not in excess of 25° C. in a solvent mixture of a minimum of 50% of a mixture of alcohols selected from the group consisting of methyl, ethyl, and isopropyl alcohol, and an aliphatic hydrocarbon selected from the group consisting of dichloropropane, trichloroethylene and chloroform, to dissolve the resins from the flakes without affecting the wax.

4. A process for deresinating candelilla wax comprising dividing the wax into particles having a maximum thickness of about 4 millimeters, then washing the wax flakes at temperatures not in excess of 25° C. in a solvent mixture of a minimum of 50% of a mixture of alcohols selected from the group consisting of methyl, ethyl, and isopropoyl alcohol, and a mixture of aliphatic hydrocarbons selected from the group consisting of dichloropropane, trichloroethylene and chloroform, to dissolve the resins from the flakes without affecting the wax.

5. A process for deresinating candelilla wax comprising dividing the wax into particles having a maximum thickness of about 4 millimeters, then washing the wax flakes at temperatures 20–25° C. in a solvent mixture of an alcohol selected from the group consisting of methyl, ethyl, and isopropyl alcohol, and an aliphatic hydrocarbon selected from the group consisting of dichloropropane, trichloroethylene and chloroform, to dissolve the resins from the flakes without affecting the wax, the solvent mixture containing a minimum of 50% alcohol, the balance comprising the aliphatic hydrocarbon.

6. A process for deresinating candelilla wax comprising dividing the wax into particles having a maximum thickness of about 4 millimeters, then washing the wax flakes at temperatures 20–25° C. in a solvent mixture of an alcohol selected from the group consisting of methyl, ethyl, and isopropyl alcohol, and a mixture of alpihatic hydrocarbons selected from the group consisting of dichloropropane, trichloroethylene and chloroform, to dissolve the resins from the flakes without affecting the wax, the solvent mixture containing a minimum of 50% alcohol, the balance comprising the mixture of aliphatic hydrocarbons.

7. A process for deresinating candelilla wax comprising dividing the wax into particles having a maximum thickness of about 4 millimeters, then washing the wax flakes at temperatures 20–25° C. in a solvent mixture of a mixture of alcohols selected from the group consisting of methyl, ethyl, and isopropyl alcohol, and an aliphatic hydrocarbon selected from the group consisting of dichloropropane, trichloroethylene and chloroform, to dissolve the resins from the flakes without affecting the wax, the solvent mixture containing a minimum of 50% alcohol, the balance comprising the aliphatic hydrocarbon.

8. A process for deresinating candelilla wax comprising dividing the wax into particles having a maximum thickness of about 4 millimeters, then washing the wax flakes at temperatures 20–25° C. in a solvent mixture of a mixture of alcohols selected from the group consisting of methyl, ethyl, and isopropyl alcohol, and a mixture of alpihatic hydrocarbons selected from the group consisting of dichloropropane, trichloroethylene and chloroform, to dissolve the resins from the flakes without affecting the wax, the solvent mixture containing a minimum of 50% alcohol, the balance comprising the mixture of aliphatic hydrocarbons.

9. A process for deresinating candelilla wax comprising dividing the wax into particles having a maximum thickness of about 4 millimeters, then washing the wax at temperatures from 20–25° C. in a mixture of solvents which dissolves the resin from the wax without affecting the wax, the mixture of solvents consisting of approximately 50% ethyl alcohol and 50% dichloroproprane.

10. A process of deresinating candelilla wax comprising dividing the wax into particles having a maximum thickness of about 4 millimeters, then washing the wax flakes at temperatures not in excess of 25° C. in a solvent mixture of approximately 50% ethyl alcohol and 50% dichloropropane.

References Cited in the file of this patent

UNITED STATES PATENTS 1,836,020     Freytag _____ Dec. 15, 1931

FOREIGN PATENTS 630,271     Great Britain _____ Oct. 10, 1949